United States Patent [19]

Genuit et al.

[11] 4,443,709

[45] Apr. 17, 1984

[54] FREQUENCY RESPONSIVE SYSTEM POWER SEQUENCER

[75] Inventors: Luther L. Genuit, Scottsdale; John R. Nowell, Phoenix, both of Ariz.

[73] Assignee: Honeywell Information Systems Inc., Phoenix, Ariz.

[21] Appl. No.: 366,738

[22] Filed: Apr. 8, 1982

[51] Int. Cl.³ .............................................. H02J 13/00
[52] U.S. Cl. ..................................... 307/41; 307/129; 340/658
[58] Field of Search ....................... 307/29, 39, 40, 41, 307/115, 129; 340/658, 825.26, 825.77; 361/183

[56] References Cited

U.S. PATENT DOCUMENTS 4,137,496  1/1979  Lind ................................. 340/658 X
4,385,241  5/1983  Peddie et al. ......................... 307/39

Primary Examiner—E. A. Goldberg
Assistant Examiner—Derek C. Jennings
Attorney, Agent, or Firm—A. A. Sapelli; W. W. Holloway, Jr.; L. J. Marhoefer

[57] ABSTRACT

The present invention relates to a power sequence device which comprises an element which generates a sequencing code which is capable of being decoded by actuators included in the various equipment cabinets. The sequencing code is initiated by a sensing element which indicates the input power has reached a stable threshold whereupon the various cabinets comprising the data processing system are turned on in a desired order. Upon loss of power, the sensing element generates a warning signal indicating an impending power loss thereby enabling the equipment to perform an orderly halt.

4 Claims, 14 Drawing Figures

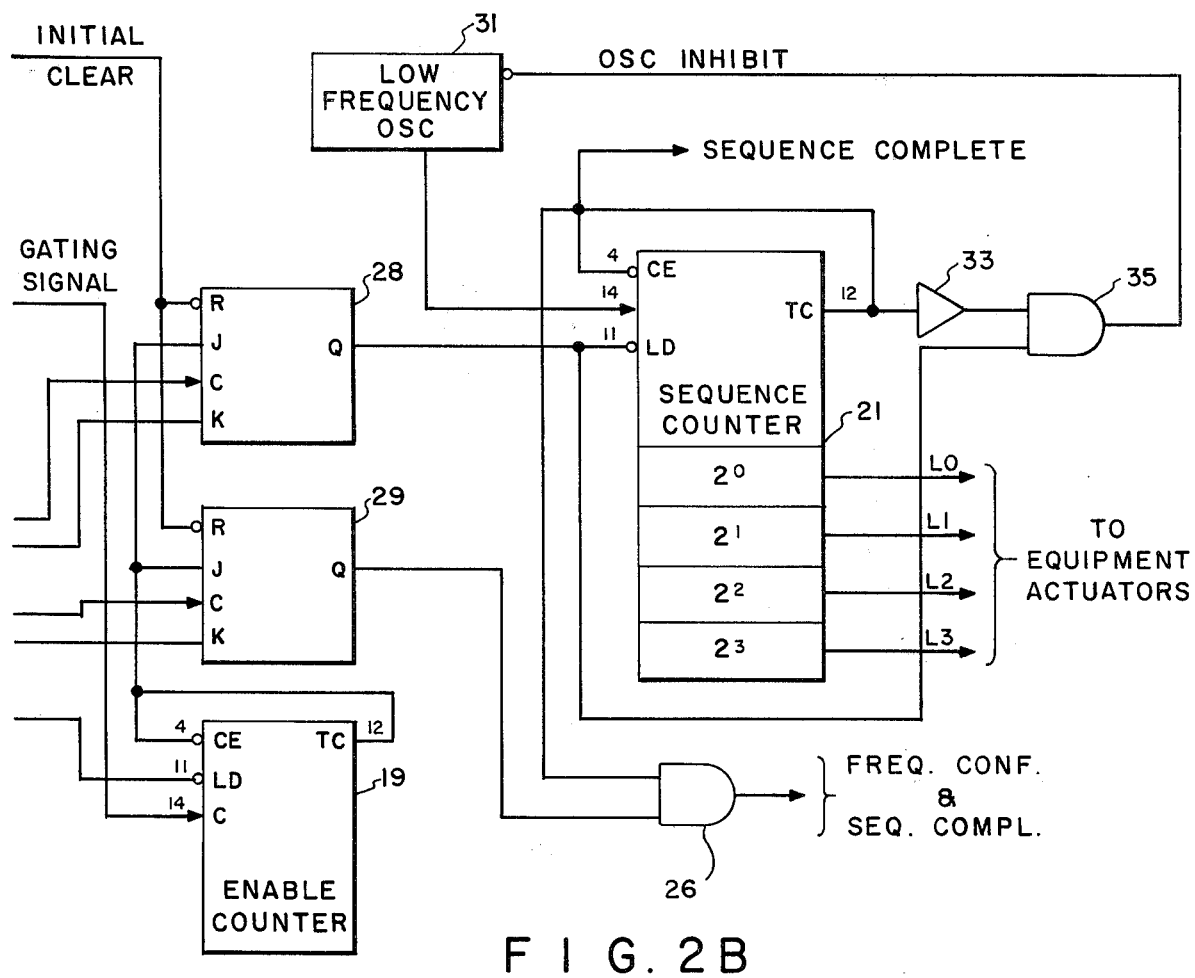
FIG. 2B
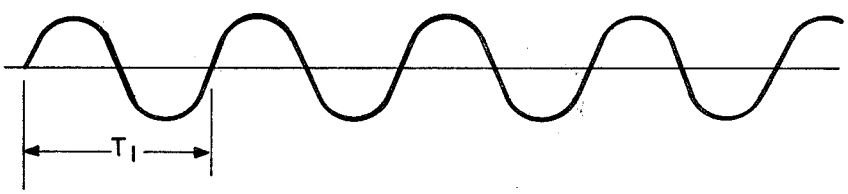
FIG. 3A.
FIG. 3B
FIG. 3C
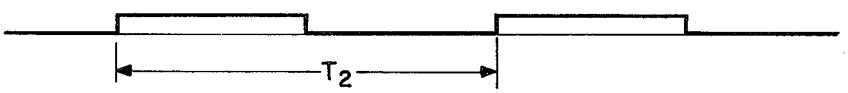
FIG. 3D
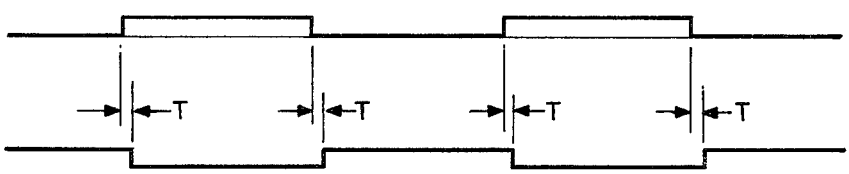
FIG. 3E
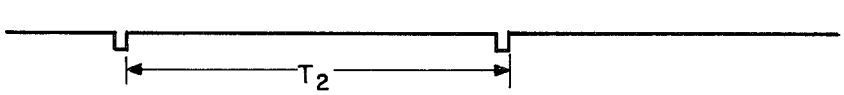
FIG. 3F

FREQUENCY RESPONSIVE SYSTEM POWER SEQUENCER

RELATED APPLICATION

The present patent application is related to U.S. patent application, Ser. No. 366,139 filed Apr. 8, 1982, entitled "Motor Generator Shutdown Circuit for Extended Ridethrough," by L. Genuit, et al., filed on even data herewith, and assigned to Honeywell Information Systems Inc., the assignee of the present application.

BACKGROUND OF THE INVENTION

This invention relates to power sequencing systems, and more particularly, to an electronic frequency responsive power sequencing system for sequential power-on and power-off control of data processing equipment connected to a motor-generator set.

In electronic systems, and especially in data processing systems, it often becomes important to apply power to the various elements or components of the electronic system in an established sequence in order to avoid destruction of the elements or components. Further, the sequence in which power is removed from the various elements or components may also be important. Many approaches for controlling these on/off sequences presently exist. One approach utilizes timers of varying time out intervals which are initiated when power is first applied.

The present invention, which may be utilized in an environment in which a motor-generator set is interposed between the utility supplied power and a power supply for generating supply voltages required by the data processing system, provides a precise digital system responsive to the generator frequency which controls the power-on sequence. In addition, the present invention includes the capability to provide advanced warning of a loss of power.

From the foregoing, it can be seen that it is a primary object of the present invention to provide a sequencer device.

It is another object of the present invention to provide a sequencer device for control of a power-on sequence.

It is yet another object of the present invention to provide a sequencer device responsive to a generator frequency for controlling the power-on sequence.

It is still a further object of the present invention to provide a sequencer device for controlling a power-off sequence.

It is still a further object of the present invention to provide advance warning of an impending power interruption.

These and other objects of the present invention will become more apparent when taken in conjunction with the following description, and attached drawings, wherein like characters indicate like parts and which drawings form a part of the present application.

SUMMARY OF THE INVENTION

Therefore, there is provided in the present invention a power sequencer for controlling the application of a power signal, via a first plurality of actuator controlled elements, to a second plurality of equipment cabinets of a system. Each equipment cabinet has associated therewith at least one actuator corresponding to one of the first plurality of actuator controlled elements. Each actuator is operatively connected to the power sequencer and responsive to a coded signal of the power sequencer. The power sequencer comprises a sensing element which determines a first predetermined frequency threshold value of the power signal. A counter element generates an output signal in response to the sensing element, the output signal having a coded sequence. Each actuator is capable of recognizing one of the codes of the coded sequence causing the power signal to be applied to the equipment cabinets in a desired sequence.

BRIEF DESCRIPTION OF THE DRAWINGS

FIGS. 2A and 2B, taken together to form FIG. 2, show a general logic diagram of a system power sequencer of the preferred embodiment of the present invention;

FIGS. 3A-3F, shows the signal waveforms at various points of the system power sequencer of FIG. 2;

DETAILED DESCRIPTION

Figure 1:
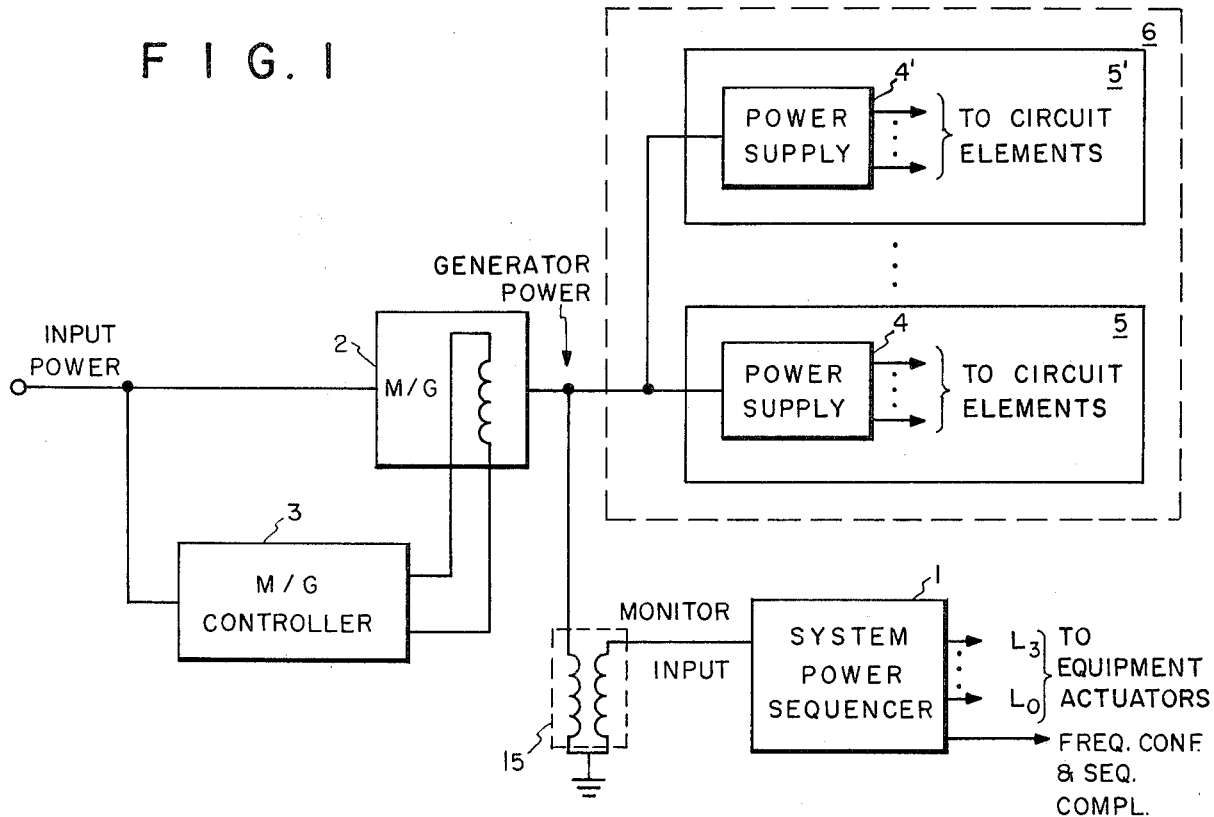
FIG. 1 shows a power generation environment of a data processing system.

Referring to FIG. 1, there is shown a system power sequencer 1 in a power generation environment of a data processing system 6. INPUT POWER, or power supplied by a utility company, drives a motor-generator set (M/G) 2 controlled by a M/G controller 3, the output of the M/G set 2 being the GENERATOR POWER which, in the preferred embodiment, is an equivalent of the INPUT POWER. The INPUT POWER of the preferred embodiment is 208 volts, 3 phase, 60 Hz, and the GENERATOR POWER is 208 volts, 3 phase, about 59.4 Hz due to M/G 2 slippage. The GENERATOR POWER is coupled to power supplies 4,4' of equipment cabinets 5,5', which make up the data processing system 6. The power supply 4, converts the GENERATOR POWER to power required by circuit elements within the equipment cabinet 5. The GENERATOR POWER can be stepped down by a transformer 15. The output of the transformer 15, the MONITOR INPUT, is coupled to the system power sequencer 1. The output of the system power sequencer 1 is coupled to various equipment actuators within the individual equipment cabinets 5 of the data processing system 6 for enabling the power to the equipment cabinet 5, the output of the system power sequencer 1 forming code information utilized by the equipment as will be described in further detail hereinunder. The system power sequencer 1 also generates a signal (FREQ CONF & SEQ COMPL) for notifying the data processing system 6 (or more specifically the central processing unit (CPU) of the data processing system) of an impending utility supplied power interruption indication of such power interruption is sensed. This will permit the data processing system 6 to perform an orderly halt so that, upon restoration of the utility supplied power, the data processing system 6 may continue without any special recovery procedures. GENERATOR POWER to the data processing system 6 will be maintained for a finite amount of time by making use of the energy stored in the fly wheel of the motor-generator set 2.

Figure 2A:
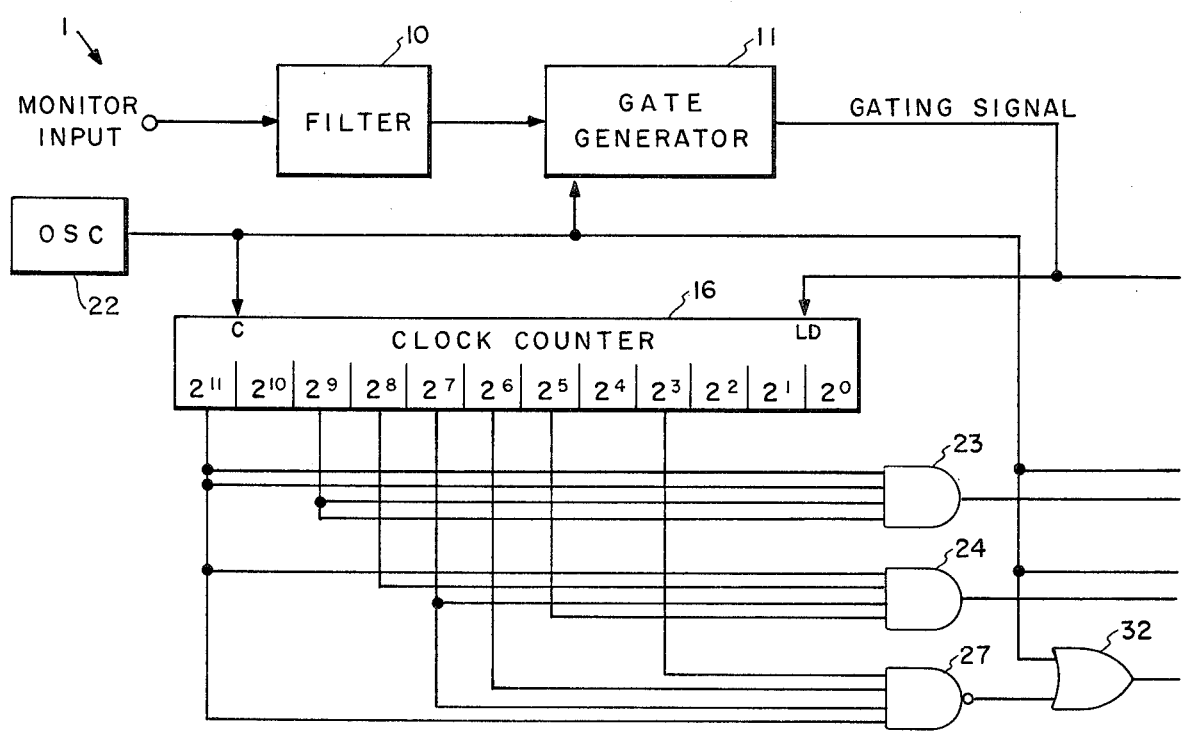

The preferred embodiment of the system power sequencer 1 of the present invention will now be described in conjunction with FIGS. 2 and 3. FIGS. 2A and 2B, which taken together form FIG. 2, show a logic diagram of the system power sequencer 1 of the present invention, and FIG. 3 shows the waveforms at various points of the system power sequencer 1. It will be understood, that when discussing the various digital signal levels, a zero or low signal level refers to a logic "zero", and likewise, a high, positive, or one signal level refers to a logic "one".

The MONITOR INPUT is coupled to a filter 10 which removes noise spikes and harmonics from the MONITOR INPUT which is derived from the GENERATOR POWER (waveform A of FIG. 3), the output of filter 10 being coupled to the gate generator 11. The gate generator 11, which will be described in detail hereinunder, generates a GATING SIGNAL (waveform F of FIG. 3) which is coupled to a clock counter 16 and to the clock input, C, of an enable counter 19. The period T2 of the GATING SIGNAL is related to the period T1 (or frequency) of the MONITOR INPUT. In the preferred embodiment, the period of the GATING SIGNAL T2 is twice the period of the MONITOR INPUT, or T2 equal 2 times T1. An oscillator 22 of known frequency is coupled to gate generator 11, and supplies clock counter 16 with clock signals at the clock input terminal, C. The clock signals of oscillator 22, are also coupled to the clock input, C, of J-K Flip-Flops 28, 29, and to an OR-gate 32. The frequency of oscillator 22 of the preferred embodiment is 64KHz. The GATING SIGNAL is connected to the unconditional reset, LD, of the clock counter 16 so that when the GATING SIGNAL is low, the clock counter 16 is reset to zero. (The GATING SIGNAL will be low for one time period of the signal of oscillator 22 as will be described in detail hereinunder.) Clock counter 16 is connected to count oscillator 22 clock signals during the time period that the GATING SIGNAL is high. Thus, clock counter 16 will essentially be enabled by the GATING SIGNAL for two full cycles of the MONITOR INPUT. For a MONITOR INPUT signal frequency of 60 Hz and an oscillator 22 of 64 KHz, the clock counter 16 will count 2133 clock pulses. Similarly, for a lower frequency, a higher number of clock pulses will be counted. Specifically, in order to be able to detect a frequency of 50 Hz, the clock counter 16 must be capable of counting to 2560. Therefore clock counter 16 contains 12 stages, the stages of the counter denoted as $2^0$ through $2^{11}$. AND-gates 23, 24 and NAND-gate 27 are connected to the output terminals of clock counter 16 as appropriate to render AND-gates 23, 24 and NAND-gate 27 responsive to the counts of 2560, 2462, and 2246, respectively, the outputs of AND-gates 23, 24 going positive at the specified counts. NAND-gate 27, goes to zero when the count of 2246 is reached. The counts of 2560, 2462, and 2246 correspond to MONITOR INPUT frequency of 50 Hz, 52 Hz, and 57 Hz, respectively. The outputs of AND-gates 23, 24 are coupled to the reset input, K, of J-K Flip-Flops 28, 29. The output of NAND-gate 27 is coupled to the OR-gate 32, the output of the OR-gate 32 in turn being coupled to unconditional reset input, LD, of enable counter 19.

Enable counter 19 counts the cycles of the GATING SIGNAL (alternate cycles of the generator power), reaching a full count of fifteen and holding the fifteen count until a reset occurs. Enable counter 19 may be reset by the occurrence of a zero level signal from the output of OR-gate 32, which can only occur if the MONITOR INPUT frequency is equal to or less than 57 Hz. If the MONITOR INPUT frequency is less than 57 Hz, the clock counter 16 will reach a count greater than 2246 in a given GATING SIGNAL period, causing the output of gate 27 to go to zero. Coincident with a zero level of the clock signal, the output of OR-gate 32 goes to zero thereby resetting enable counter 19. Conversely, if the monitor input frequency is greater than 57 Hz, the count of 2246 will not be reached by clock counter 16, causing enable counter 19 to reach and sustain the full count of fifteen GATING SIGNAL cycles. When a full count of fifteen is reached by enable counter 19, a positive voltage appears at the output, TC, of enable counter 19 which is coupled to the CE input of enable counter 19 allowing the full count to be held, and the output of enable counter 19 also being coupled to the J input of J-K Flip-Flops 28, 29.

Sequence counter 21 is a four stage counter connected to count pulses from a low frequency oscillator 31. Low frequency oscillator 31 may be a low frequency square wave oscillator with a period of ½ second or less. Sequence counter 21 is reset to zero when its unconditional reset input, LD, goes to zero and begins to count up from zero when the LD input goes high. Four output lines, L0, L1, L2, and L3, are connected to the output terminals of the stages of sequence counter 21, the stages being denoted by $2^0$ through $2^3$ each stage comprising a bit, or unit, of the code. The output lines are coupled to the equipment actuators located in the various equipment cabinets 5 that are controlled by the system power sequencer 1. Each equipment actuator is individually coded to respond to a given code delivered by the four output lines, the equipment actuator responding to its given code by turning the equipment cabinet 5 on, the operation of the equipment actuator to be described in detail hereinunder. A zero count of sequence counter 21 causes all equipment actuators to respond by turning their respective equipment cabinets 5 off. In the preferred embodiment enable counter 19 and sequence counter 21 is each comprised of a four stage counter integrated circuit chip 74LS191. The clock counter is comprised of three cascaded 74LS191 integrated circuit chips.

Still referring to FIG. 2, the system operation of the system power sequencer 1 will now be described. Assume at this point that a total system power off cycle has occurred so that all equipment including the motor-generator set 1 has been de-energized. At start-up, the generator frequency builds up as the rotational speed of the motor-generator set 2 increases. When the generator is energized via M/G controller 3, the generator voltage turns on causing an INITIAL CLEAR, signal, coupled to the reset input, R, of J-K Flip-Flops 28, 29, to be issued thereby resetting JK Flip-Flops 28, 29, their respective output, Q, thereby set to zero. The output, Q, of J-K Flip-Flop 28, coupled to the unconditional reset, LD, of sequence counter 21, resets sequence counter 21. When the MONITOR INPUT frequency is equal to or greater than 57 Hz, enable counter 19 starts to count up to its full count. When enable counter 19 reaches a full count of 15, the output of enable counter 19 goes high setting the J-K Flip-Flops 28, 29 resulting in their respective outputs going high. The high output of J-K Flip-Flops 28 enables sequence counter 21. The output of J-K Flip-Flops 28 is also coupled to an AND-gate 35, and together with the high output of inverter 33, causes the output of AND-gate 35 to go high thereby enabling low frequency oscillator 31. Sequence counter 21 counts output pulses from low frequency oscillator 31 generating 15 successive counts (sequence code, or more simply, code) to lines L0 through L3, thereby turning on equipment cabinets 5 addressed by each of the successive counts. When sequence counter 21 reaches a full count, the output, TC, of sequence counter 21 goes high indicating that the on-sequencing cycle (SEQ COMPL) has been completed. The output of inverter 33 goes low thereby causing the output of gate 35 to go to zero disabling low frequency oscillator 31. Further, the high level at the output of sequence counter 21 is coupled to the CE input of sequencer counter 21 causing the sequence counter 21 to hold at the full count. The output of sequence counter 21 is combined with the output of J-K Flip-Flop 29 by AND-gate 26 which results in a signal indicating that the generator frequency is established (frequency confidence) and that the on-sequence is complete (FREQ CONF and SEQ COMPL).

Upon the interruption of input power, the generator will begin to slow down and the MONITOR INPUT frequency begins to decay. When the frequency falls below 57 Hz, the count of 2246 will be recognized by NAND-gate 27 whereupon its output will go to zero, resetting enable counter 19. As the generator slows down, the frequency continues to decay until it falls below 52 Hz at which time a count of 2462 is detected by AND-gate 24. The resulting high output of AND-gate 24 resets the output of J-K Flip-Flop 29 to zero. The output of J-K Flip-Flop 29 causes the output of AND-gate 26 to go low, the FREQ CONF and SEQ COMPL signal goes low, indicating that frequency confidence has been lost.

The MONITOR INPUT frequency continues to decay further to 50 Hz, whereupon AND-gate 23 detects a count of 2560. The output of AND-gate gate 23 goes high, resetting J-K Flip-Flop 28, which causes its output to go to zero. The zero signal from J-K Flip-Flop 28 resets sequence counter 21 to a count of zero such that all connected equipment cabinets 5 are powered down.

The period of time that is involved between the indicated loss of frequency confidence at 52 Hz and the shut down of the equipment cabinets 5 at 50 Hz is a time which may be utilized by the operating system, namely the software and/or the CPU to perform the housekeeping routines such as storing register contents in memory, etc. This procedure eliminates recovery time and reduces start-up time when power returns.

Figure 4:
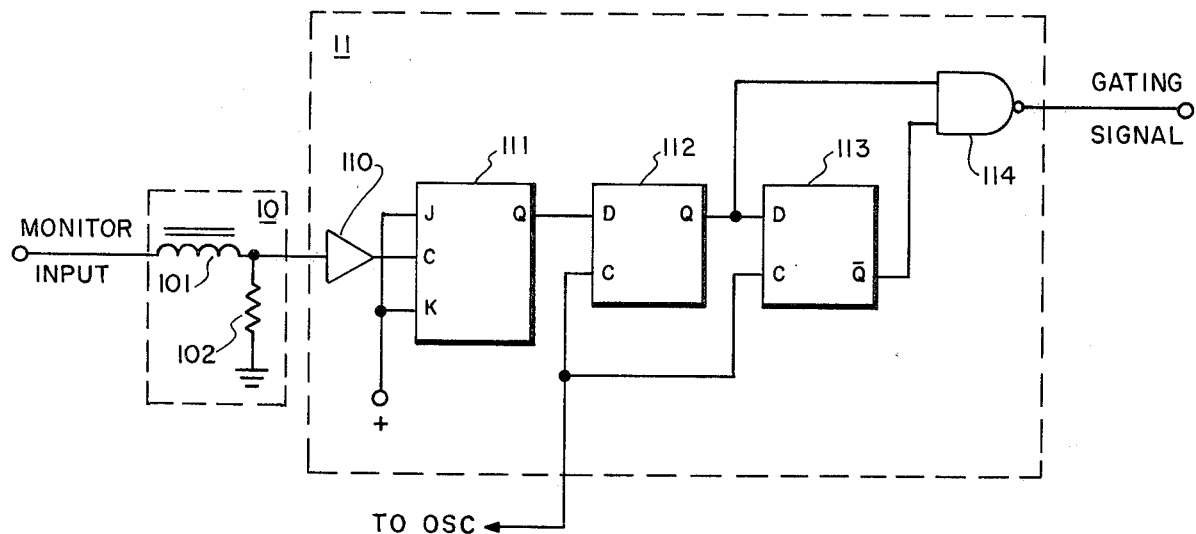
FIG. 4, shows a detailed logic diagram of the gate generator of the preferred embodiment of the present invention.

FIG. 4 shows a detailed logic diagram of the gate generator 11. Referring to FIGS. 3 and 4 the gate generator will now be described. The MONITOR INPUT is coupled to a filter 10, comprised of an inductor 101 and a resistor 102, which removes noise spikes and harmonics from the MONITOR INPUT signal. The output of the filter 10 having a period T1 (waveform A of FIG. 3) is coupled to a comparator 110 of the gate generator 11. The gate generator 11 is comprised of the comparator 110, which is coupled to a J-K Flip-Flop 111. The output, Q, of the J-K Flip-Flop 111 is coupled to a first D-type Flip-Flop 112, which in turn is coupled to a second D-type Flip-Flop 113, both of which are clocked by clock signals from oscillator 22. The output, Q, of the first D-type Flip-Flop 112 and the output, $\bar{Q}$, of the second D-type Flip-Flop are coupled to a NAND-gate 114, the output of the NAND-gate 114 yielding the GATING SIGNAL.

Comparator 110 converts the sine-wave signal to a square wave, waveform B of FIG. 3, which also has a period of T1. J-K Flip-Flop, 111 which performs a divide by two operation, is triggered by each successive negative edge of waveform B and outputs a signal having a period T2 which is twice the period of the input waveform, waveform C of FIG. 3. Therefore, the period of the waveform C of FIG. 3 corresponds to two complete cycles of the MONITOR INPUT or GENERATOR POWER. The effect of a one cycle disturbance or a single distorted waveform from the generator is thus somewhat diminished, if a compensating distortion occurs during the next half cycle. The output of J-K Flip-Flop 111 is coupled to the first D-type Flip-Flop 112 which is set by the output signal of J-K Flip-Flop 111 coincident with the clock signal of oscillator 22. The output of the first D-type Flip-Flop 112 is shown as waveform D in FIG. 3. The output of the first D-type Flip-Flop 112 is coupled to the input of second D-type Flip-Flop 113 which is set by the output signal of the first D-type Flip-Flop 112 coincident with the next clock signal from oscillator 22, resulting in an output signal E of FIG. 3 which goes negative at the next clock signal. Waveform D and waveform E of FIG. 3 switch states one oscillator 22 clock signal period, T, with respect to each other. The respective outputs of the first and second D-type Flip-Flop 112, 113 are coupled to NAND-gate 114, the output of NAND-gate 114, waveform F of FIG. 3, being high except during the one clock period when the signals of waveform D and E of FIG. 3 are both high. This results in the GATING SIGNAL having a period of T2, or twice the MONITOR INPUT frequency.

Figure 5:
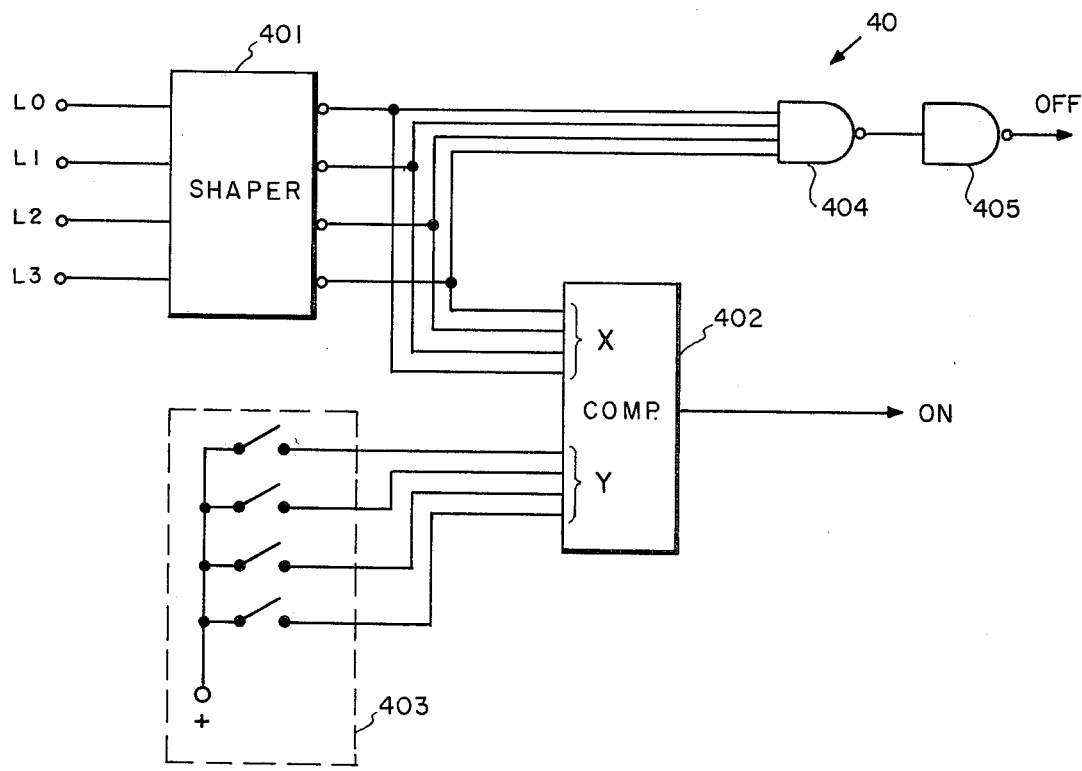
FIG. 5, shows a block diagram of the equipment actuators.

Referring to FIG. 5, there is shown a block diagram of the equipment actuator 40 which is located within the individual equipment cabinets 5. The coded input signals, L0, L1, L2, and L3 supplied to equipment actuator 40 by the sequencer counter 21, are reshaped by shaper 401 which also inverts the coded input signals. The output signals of shaper 401 are coupled to the respective X inputs of a 4-bit magnitude compare circuit (or more simply referred to hereinafter as a compare circuit) 402. A manually operated switch 403, which is set by the operator to define a relative time of power on, is coupled to the respective Y inputs of compare circuit 402. When a comparison occurs, an ON signal is outputted from compare circuit 402 which momentarily energizes a relay (not shown) connected in parallel with a momentary POWER-ON button (not shown) of the equipment cabinet 5. Thus the equipment cabinet 5 is turned on just as though the operator were to depress the POWER-ON button. When the four coded input lines are all at a zero level, all the equipment cabinets 5 are shut down simultaneously. The four zero levels received are inverted to one's by the shaper 401 and the positive levels are applied as inputs to the four-input NAND-gate 404 which converts the four high levels to a zero at its output. This zero level is inverted by a driver 405 to a positive signal (OFF signal). The OFF signal operates a relay in parallel with a POWER-OFF button (not shown) to cause the power to the equipment cabinet 5 to turn off.

Although the preferred embodiment described above performs a simultaneous shutdown, it is to be understood that a sequential power shutdown may also be incorporated into a power sequencer by applying the principles taught above for the power on sequence.

Figure 6:
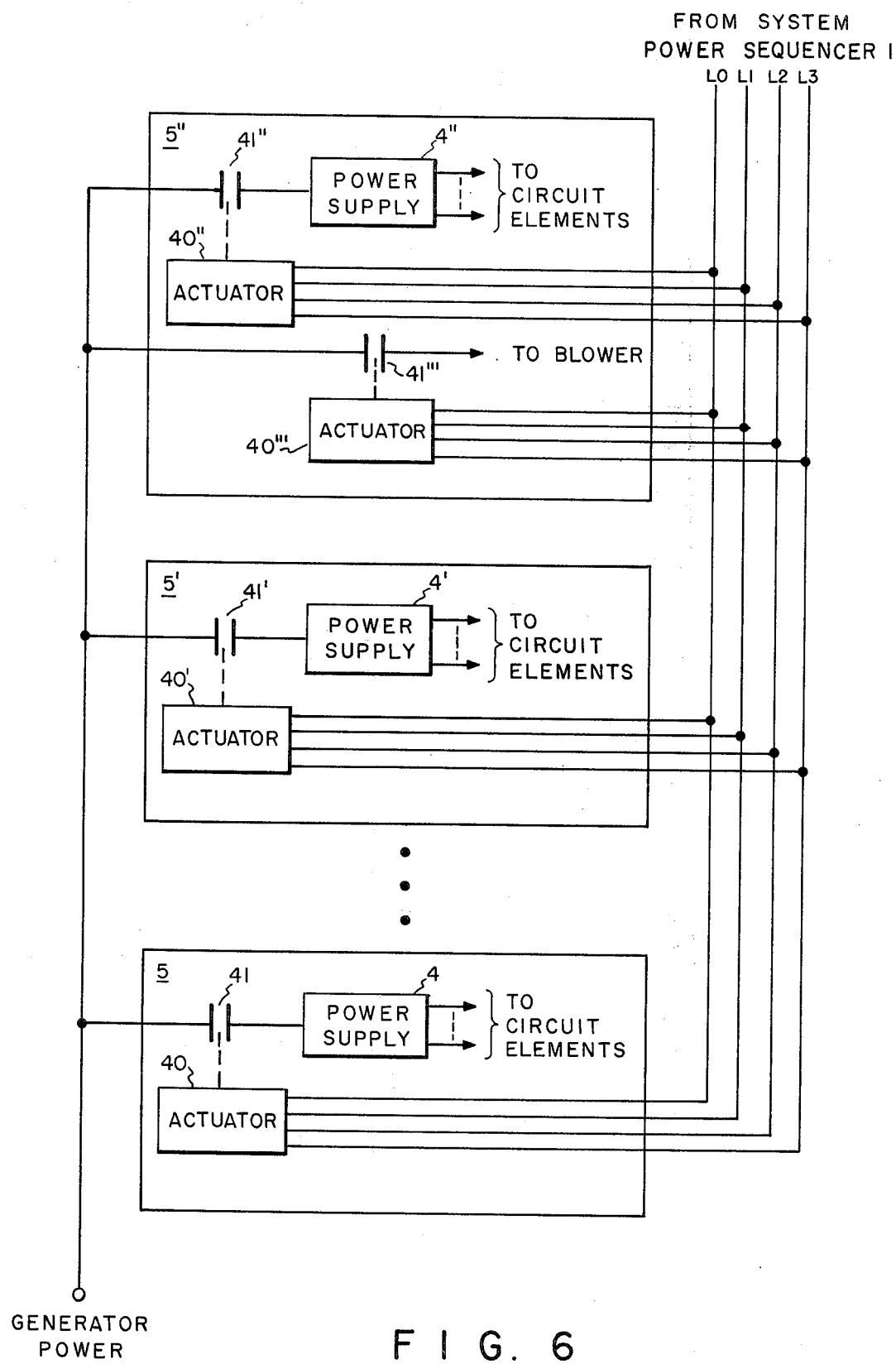
FIG. 6 shows a block diagram, of the preferred embodiment of the present invention, of the equipment actuators incorporated in the equipment cabinets.

Referring to FIG. 6, there is shown, in the preferred embodiment, an arrangement whereby each equipment cabinet 5 is to be sequenced on in a predetermined sequence. Each equipment cabinet 5 has an individual power supply 4, under control of its corresponding equipment actuator 40 in response to the coded sequence output of system power sequencer 1. The controlled element of equipment actuators 40 is shown functionally as a relay 41 which couples the GENERATOR POWER to the power supply 4. In addition, for purposes of example, equipment cabinet 5" has a second equipment actuator 40'" which controls power application to a specified element, such as a blower. Assume in the following sequence that it is desired that the blower (not shown) be turned on before power is applied to the circuit elements of equipment cabinet 5". It is to be understood that the following example is for illustrative purposes and is not to limit the present invention. It is to be further understood that the application of GENERATOR POWER may be directly applied to the blower or indirectly applied through a transformer, converter, power supply, etc.

Assume the desired sequence is as follows. Equipment Cabinet 5 is to be turned on (have power applied to the circuit elements of the respective equipment cabinet, and assume no delay in power supply 4 turn on) first. Two seconds later equipment cabinet 5" is to be turned on and equipment cabinet 5' is to be turned on 2.5 seconds after that. Assume further that the blower is to be turned on 1 second before appliction of power to the circuit elements of the equipment cabinets 5". This sequence is achievable, assuming a one-half second period for low frequency oscillator 31, by setting the manual switches 403 of the equipment actuators to correspond to the code determined by the L3, L2, L1, L0 output signal as shown in Table 1.

TABLE 1

| EQUIP. ACT. | EQUIP. CABINET | RELATIVE TURN-ON TIME | CODE | | | |
|---|---|---|---|---|---|---|
| | | | L3 | L2 | L1 | L0 |
| 40 | 5 | 0 | 0 | 0 | 0 | 1 |
| 40'" | (Blower) | 1 | 0 | 0 | 1 | 1 |
| 40" | 5" | 2 | 0 | 1 | 0 | 1 |
| 40' | 5' | 4.5 | 1 | 0 | 1 | 0 |

Figure 7:
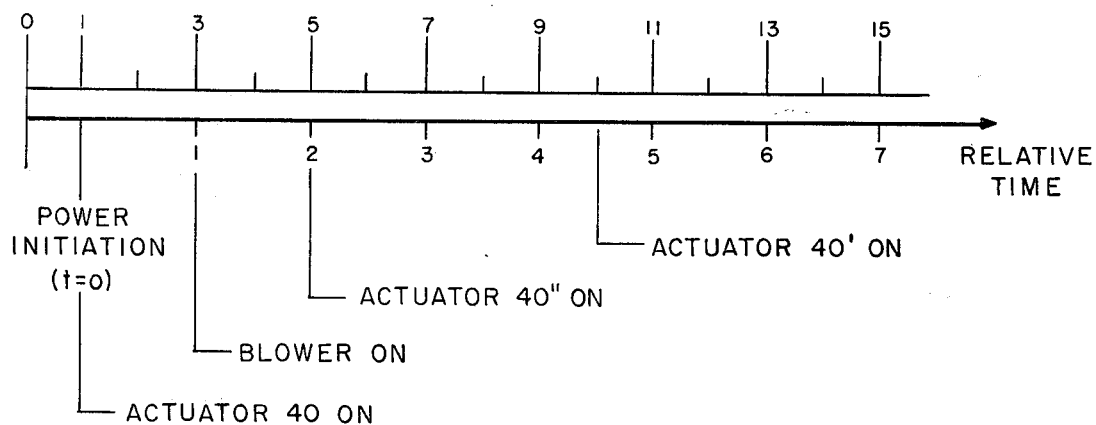
FIG. 7 shows a time line relating to the various settings of the manual switches of the equipment actuators.

From the time line of FIG. 7, the correspondence between the code and the relative turn-on time of the Table 1 can be more readily seen.

Figure 8:
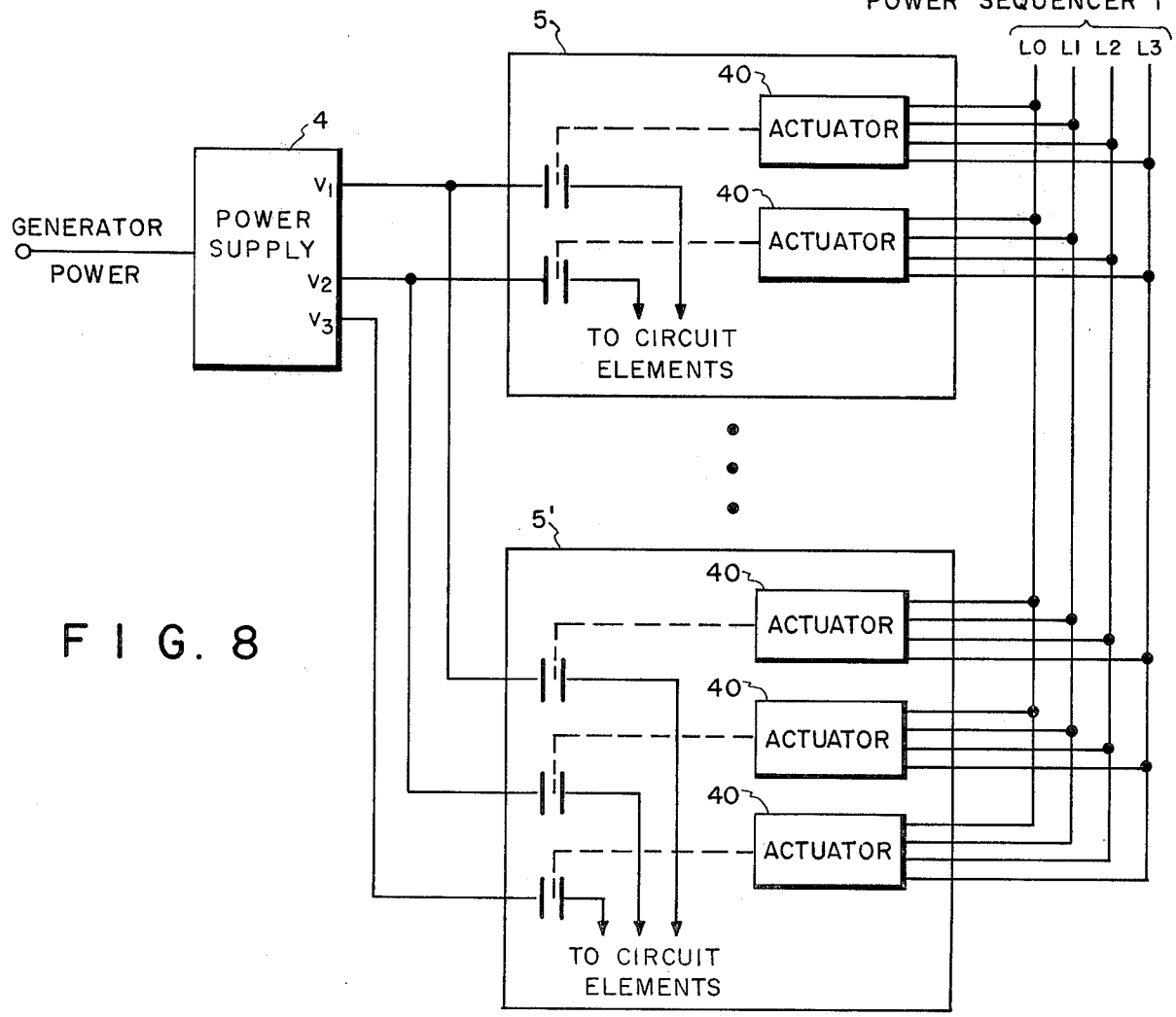
FIG. 8 shows a block diagram of an alternative embodiment incorporating the equipment actuators in the equipment cabinets.

Referring to FIG. 8, there is shown an alternative embodiment of the application of power to the circuit elements of the equipment cabinets. The system configuration of FIG. 8, utilizes a single power supply for generating converted power supply voltages V1, V2, V3 which can be applied to the circuit elements of equipment cabinet 5 in any desired sequence by properly selecting the manual switches 403 of equipment actuators 40 to correspond to a desired sequence in a manner as described above.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. A power sequencer for controlling the application of a power signal, via a first plurality of actuator controlled elements to a plurality of equipment cabinets of a system, each equipment cabinet having associated therewith at least one actuator corresponding to one of said first plurality of actuator controlled elements, each actuator operatively connected to said power sequencer and responsive to a coded signal of said power sequencer, the power sequencer comprising:
    (a) means for generating a gating signal having a first and second state, the duration of the first state of said gating signal having a predetermined relationship to the frequency of said power signal;
    (b) means, having an input terminal adapted to receive a clock signal of a predetermined frequency, for counting said clock signal during an enable period of said means for counting determined by the first state of said gating signal;
    (c) first gate means for combining a first count of said means for counting, to output a first output signal when a first predetermined frequency threshold value of said power signal is detected;
    (d) second gate means for combining a second count of said means for counting, to output a second output signal when a second predetermined frequency threshold value of said power signal is detected; and
    (e) means, having a first and second input terminal adapted to receive said first output signal and said second output signal, respectively, for generating an output signal, whereby said output signal is generated in response to said first output signal thereby initiating a power-on sequence and said output signal is inhibited in response to said second output signal thereby initiating a power off sequence of said equipment cabinets, the output signal having a coded sequence, each actuator being capable of recognizing one of the codes of said coded sequence causing said power signal to be applied to each of the equipment cabinets in a desired sequence.

2. A power sequence, according to claim 1, further comprising:
    a third gate means for combining a third count of said means for counting, to output a third output signal when a third predetermined frequency threshold value of said power signal is detected, upon the removal of the power signal the third predetermined frequency threshold value occurring prior in time to the second predetermined frequency threshold value, said third output signal thereby providing an advanced warning of the impending power off sequence.

3. A power sequencer, according to claim 2, wherein said means for generating comprises:
    (a) sequence counter means, having a plurality of stages, each stage having an output terminal adapted to transmit a corresponding unit of the code of the coded sequence of said output signal; and (b) gate means for controlling said sequence counter means in response to said first and second output signal.

4. A power sequencer for controlling the application of a first plurality of converted power signals to a plurality of equipment cabinets of a system, said converted power signals being generated from an input power signal, each converted power signal operatively connected to at least one equipment cabinet, each operative connection including an actuator controlled element, each actuator controlled element having a corresponding actuator, each actuator operatively connected to said power sequencer and responsive to a coded signal of said power sequencer, said power sequencer comprising:

(a) means for generating a gating signal having a first and second state, the duration of the first state of said gating signal having a predetermined relationship to the frequency of said input power signal;

(b) means, having an input terminal adapted to receive a clock signal of a predetermined frequency, for counting said clock signal during an enable period of said means for counting determined by the first state of said gating signal;

(c) first gate means for combining a first count of said means for counting, to output a first output signal when a first predetermined frequency threshold value of said input power signal is detected;

(d) second gate means for combining a second count of said means for counting, to output a second output signal when a second predetermined frequency threshold value of said input power signal is detected; and (e) means, having a first and second input terminal adapted to receive said first output signal and said second output signal, respectively, for generating an output signal, whereby said output signal is generated in response to said first output signal thereby initiating a power-on sequence and said output signal is inhibited in response to said second output signal thereby initiating a power off sequence of said equipment cabinets, the output signal having a coded sequence, each actuator being capable of recognizing one of the codes of said coded sequence causing said converted power signal to be applied in a desired sequence.

* * * * *